United States Patent Office 3,608,400
Patented Sept. 28, 1971

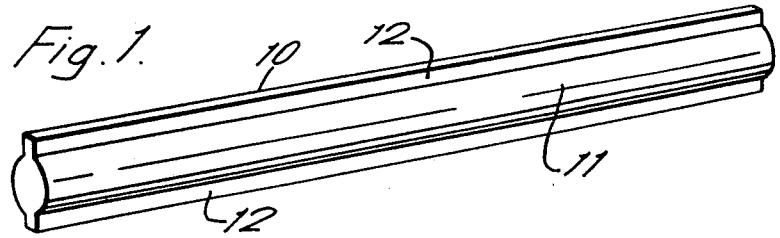
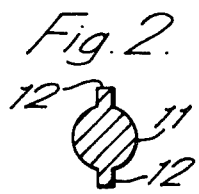 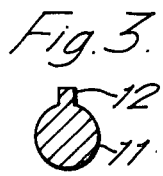 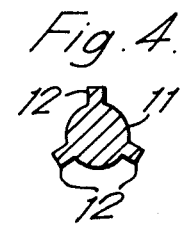
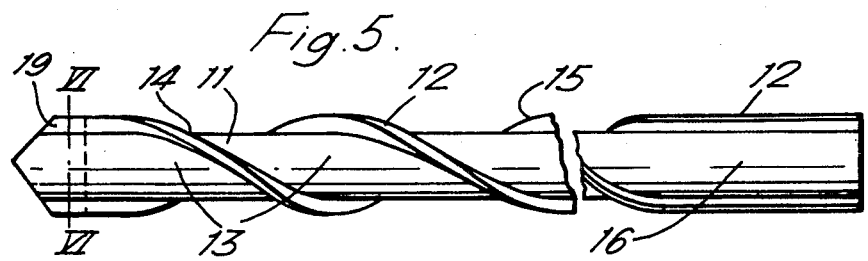
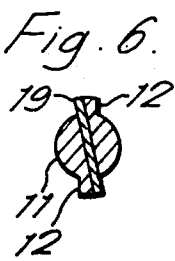
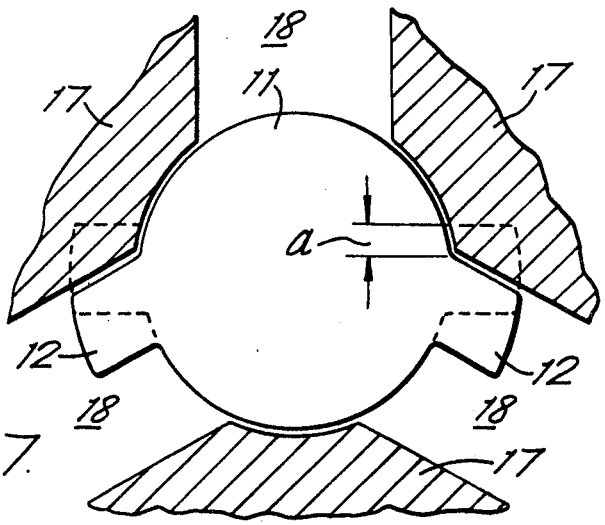

3,608,400
METHOD FOR PRODUCING A TWIST DRILL OR A SIMILAR TOOL HAVING ONE OR MORE HELICAL FLUTES OR GROOVES AND A TOOL PRODUCED BY SAID METHOD
Louis Aackersberg Mortensen, Hillerodvej 1, DK-3480 Fredensborg, Petersholm, Denmark
Filed Aug. 22, 1969, Ser. No. 852,212
Int. Cl. B21k 5/02
U.S. Cl. 76—108T                    4 Claims

ABSTRACT OF THE DISCLOSURE

A method, wherein a twist drill or a similar tool having one or more helical flutes or grooves is produced from a rod-shaped blank having a core with a substantially circular cross section from which one or more circumferentially spaced ridges or ribs extend radially and axially. When twisted, the core of the blank constitutes a columnar circularly cylindrical core of the tool, and in connection with the cylindrical surface of the core the side walls of the ridges or ribs define the flutes or grooves of the tool.

BACKGROUND OF THE INVENTION (1) Field of the invention

The present invention relates to a method for producing a twist drill or a similar tool having one or more helical flutes or grooves, the flute or flutes being formed by twisting a rod-shaped blank.

(2) Description of prior art

By using methods of this type and twisting a blank having a flat and/or edged cross section it is possible to produce twist drills and similar tools substantially more simply and economically than when using other known methods involving milling the helical flutes in a rod-shaped blank having a circular cross section. However, tools produced by the known twisting methods have a relatively weak core being able to transmit only relatively small axial loads only without deflection of the tool, because only the portion of the cross section of the tool situated within the inscribed circle of the cross section can effectively transmit such axially directed loads.

SUMMARY OF THE INVENTION

The present invention has for its object to provide a method of the type described by means of which it is possible to produce twist drills and similar tools with relatively capacious helical flutes and having despite thereof a columnar core with an effective cross section of a size permitting that the tool is used as a drill of the type subjected to a succession of blows during use, or intended for other purposes requiring transmission of relatively high axial loads.

The method according to the invention is characterized by using a blank having a cylindrical core with a substantially circular cross section and one or more circumferentially spaced ridges or ribs extending axially along the cylindrical surface of the core. By twisting a blank having such cross section it is possible to produce a tool having flutes or grooves, the number of which corresponds to the number of the radial ribs on the blank, and the depth of which depends on the radial height of the ribs. Just like the rod-shaped blank, the finished tool will have a substantially circular core cross section along the whole length thereof, and thus have a through-going unimpaired cylindrical core enabling the tool to transmit rather high axial loads. It has been found that due to the cylindrical core the borings or material cut by the drill does not tend to pack with the flutes or groove, even when the pitch of the flutes is made relatively coarse, i.e. the blank need to be twisted to a rather small degree only. Presumably the reason is that for a certain outer drill diameter the flutes are situated closer to the tool axis in a tool produced by twisting a blank having a flat cross section than in a tool produced in accordance with the invention. Therefore for a certain pitch of the flutes, the distance which the cut material is displaced within the flutes for each revolution during operation of the tool, is greater for the last-mentioned tool produced in accordance with the invention than for the first-mentioned conventionally produced tool.

When used in the specification, the term "substantially circular cross section" should be interpreted so as to comprise any cross section for which $Dc-Di$ is zero or substantially smaller than $Di$, $Dc$ and $Di$ being the diameter of the circumscribed and the inscribed circle, respectively, of the cross section. Thus, it is to be understood that the term "substantially circular cross section" comprises cross sections being regular polygons such as hexagons, octagons, etc. The value of $Dc-Di$ should, however, be substantially smaller than the radial height of any of the ridges or ribs.

In a tool produced by the method according to the present invention, the cylindrical core also extends through the shank portion of the tool, whether that portion has been twisted (which is normally not the case) or not. Therefore, the shank portion may be set up in a conventional chuck, the jaws of the chuck being able to engage the circularly cylindrical surface of the core whereby the tool is centred in the chuck. If the radial ribs are shaped in such a manner or are present in such a number that they prevent the jaws of the chuck from engaging the cylindrical surface of the core, all of or some of the ribs may be removed from the shank portion of the tool in any suitable manner.

In one embodiment of the invention a blank having three equally spaced ribs may be used. In this case the ribs will not prevent the setting up and centering of the untwisted shank portion of the finished tool in a conventional chuck having three movable jaws, provided that each of the ribs has a suitable small circumferential thickness, because the ribs may then be accommodated in the spaces between the jaws, which may then come into engagement with the cylindrical surface of the core. The same effect is obtained in case a blank having one rib only, is used.

Alternatively, according to the invention a blank having two diametrically oppositely arranged ribs may be used, and on the part of the blank intended for constituting a shank portion for setting up the tool, these ribs may be bent and possibly also circumferentially displaced towards each other by a plastic deformation. The presence of two diametrically oppositely arranged ribs permits a good and durable mounting of a conventional plate of cemented carbide forming the bit of the tool, because the ribs render it possible to support the diametrically arranged plate along the whole width thereof, whereby the risk that parts of the brittle plate are broken off during use of the tool is considerably decreased. The diametrically arranged ribs cannot be accommodated in the spaces between the jaws of a conventional 3-jaw chuck. If, however, the ribs are bent and possibly also circumferentially displaced towards each other as mentioned above, for example by means of a press and a suitable forming tool, the ribs on the shank portion may be brought into such a position that they may be accommodated in two of the spaces between the jaws of a normal chuck. Especially when the diameter of the tool to be produced is rather small, it is substantially more advantageous to make such plastic deformation of the rib than to remove the ribs on the shank portion, because the ribs increase the strength of the shank portion to a substantial degree.

BRIEF DESCRIPTION OF THE DRAWING

Further characteristics and advantages of the present invention will appear from the following description with reference to the drawing, wherein FIG. 1 shows a rod-shaped blank, which is used in connection with a presently preferred embodiment of the method according to the invention, FIG. 2 shows a cross section of the blank shown in FIG. 1, FIGS. 3 and 4 show cross sections of two other rod-shaped blanks, which may be used in connection with the method according to the invention, FIG. 5 shows a side view of a twist drill produced by the method according to the invention, the blank shown in FIGS. 1 and 2 having been used, FIG. 6 shows a cross section at VI—VI in FIG. 5, and FIG. 7 shows in an enlarged scale a partial cross section of the jaws of a conventional 3-jaw chuck, in which the drill shown in FIG. 5 has been set up.

DESCRIPTION OF THE PREFERRED EMBODIMENTS

FIG. 1 shows a rod-shaped blank 10 having a circularly cylindrical core 11 and two diametrically oppositely arranged radial ribs 12. The blank 10 has a uniform cross section along its whole length, and may advantageously be made by rolling. From the blank 10 a tool having two helical flutes or grooves 13 (for example the twist drill 15 shown in FIG. 5) may be produced by twisting one end portion of the blank round the longitudinal axis thereof to such a degree that the desired pitch of the flutes 13 is obtained. The twisting may be performed either in a special-purpose machine, or in a conventional machine tool having rotatable mandrels, such as a turning lathe. The twisting is normally performed when the blank is in a cold condition. The blank may, however, be heated before and/or during twisting thereof. The twisted portion of the blank 10 constitutes an operative portion 14 of the twist drill 15 shown in FIG. 5, whereas the non-twisted end portion of the blank constitutes a shank portion 16.

If the non-twisted end portion of the blank shown in FIGS. 1 and 2 is to constitute the shank portion 16 without any further adaption, the diametrically oppositely directed ribs 12 would prevent a satisfactory setting up of the blank in a normal chuck of the type having three jaws 17, vide FIG. 7. Therefore, it is necessary either to remove the ribs 12 on the shank portion 16 (which is normally not preferred, because the shank portion is weakened thereby), or to deform the ribs in such a manner that they may be accommodated in the space 18 between the jaws 17 of the chuck. In FIG. 7 the original position of the ribs 12 on the shank portion 16 is indicated by dotted lines. By a simple operation, for example by the use of a forming tool and a press, the ribs 12 may be bent towards each other in a circumferential direction, and furthermore, each rib may also be displaced a small distance $a$ along the cylindrical surface of the core 11, whereafter the ribs assume the positions indicated by solid lines in FIG. 7. It is understood that provided that the thickness of each rib 12 is smaller than the width of each of the spaces 18 between the jaws 17 when the chuck has been tightened around the shank portion 16, all of the three jaws 17 may come into engagement with the cylindrical surface of the core 11, whereby the shank portion and thus the whole tool may be correctly centered in the chuck. Even if the chuck is not very well tightened around the shank portion, the ribs 12 will prevent the tool from rotating in relation to the chuck.

Due to the fact that a tool produced by the method according to the invention has an unimpaired through-going columnar core 11, the strength of the tool is so high that the tool is suited to be used as a drill of the type to which a succession of blows is imparted during the drilling operation. Hitherto it has been necessary to produce drills of that type by a much more expensive manufacturing process.

In a manner known per se, the free end of the operative portion 14 of the drill shown in FIG. 5 is provided with a plate 19 of cemented carbide. As mentioned previously, the drill 15 is produced from the blank shown in FIGS. 1 and 2 and having two diametrically oppositely directed ribs, and this fact renders it possible to obtain an excellent support of the plate 19 along the full width thereof, because the plate 19 may be positioned in a diametrically and axially extending slot adjacent to the ribs 12 as shown in FIG. 6.

When in accordance with the invention a tool is produced from a blank having the cross section shown in FIG. 2, a tool having two flutes or grooves is obtained. However, alternatively, rod-shaped blanks having cross sections as shown in FIGS. 3 and 4 may be used, whereby tools having one and three flutes, respectively, are obtained. If the shank portions of these tools are constituted by non-twisted end portions of the corresponding blanks, the shank portions may right away and without a preceding deformation of the ribs 12 be set up in a conventional 3-jaw chuck.

It should be understood that various modifications of the above described methods for producing tools with helical flutes could be made without departing from the scope of the present invention. For example it is possible to use blanks having more than three radial ribs, but in that case at least some of the ribs and possibly all of the ribs on the shank portion of the tool must be removed in order to permit setting up the tool in a conventional chuck. Although the above described deformation of the ribs 12 on the shank portion is normally performed when the operative portion of the tool has been twisted, the said deformation may be performed before the twisting operation, if desired. It is also possible to twist the portion of the blank 10 constituting the shank portion of the tool, if that shank portion is twisted to such a degree that the jaws 17 of a chuck may secure and centre the tool by engaging the radially outmost surfaces of the ribs. It should also be mentioned that rod-shaped blanks 10 may be cut from a longer rolled bar steel member before the blanks are twisted. It is possible, however, and may in some cases be advantageous, to cut the blanks when the twisting has already been performed. It should also be understood that the rolled blank from which the tool is produced by twisting may have a cross section as that shown by solid lines in FIG. 7, whereby the previously described deformation of the ribs on the shank portion of the tool after twisting the operative portion is superfluous.

I claim:
1. A method in producing a tool with an operative portion and a shank portion, said tool having helical flutes or grooves, comprising
(a) twisting a portion of the length of a rod-shaped blank having a cylindrical core with a substantially circular cross section and three circumferentially spaced ridges or ribs extending axially along the cylinder surface of said core, and
(b) leaving an adjacent length portion of the blank intended to form the shank portion of the tool untwisted, whereby said shank portion may be set up in a conventional three-jaw chuck.

2. A tool produced by the method according to claim 1.

3. In a method for producing a tool with an operative portion and a shank portion, said tool having helical flutes or grooves and comprising twisting a rod-shaped blank having a cylindrical core with a substantially circular cross section, the improvement wherein a blank having three circumferentially spaced ridges or ribs extending axially along the cylindrical surface of the core is used, only the length portion of the blank intended to form the operative portion of the tool being twisted and an adjacent portion of the blank intended to form the shank portion of the tool remains untwisted.

4. A twist drill produced by the method according to claim 3.

References Cited

UNITED STATES PATENTS

| | | | |
|---|---|---|---|
| 360,941 | 4/1887 | Wilson | 76—108TUX |
| 1,543,608 | 6/1925 | Leidecker | 76—108T |
| 3,190,380 | 6/1965 | Anderson | 76—108X |

BERNARD STICKNEY, Primary Examiner

U.S. Cl. X.R.

77—70